Feb. 10, 1953    R. H. STEARNS ET AL    2,627,976
MAGNETIC SEPARATOR
Filed July 24, 1950    3 Sheets-Sheet 1
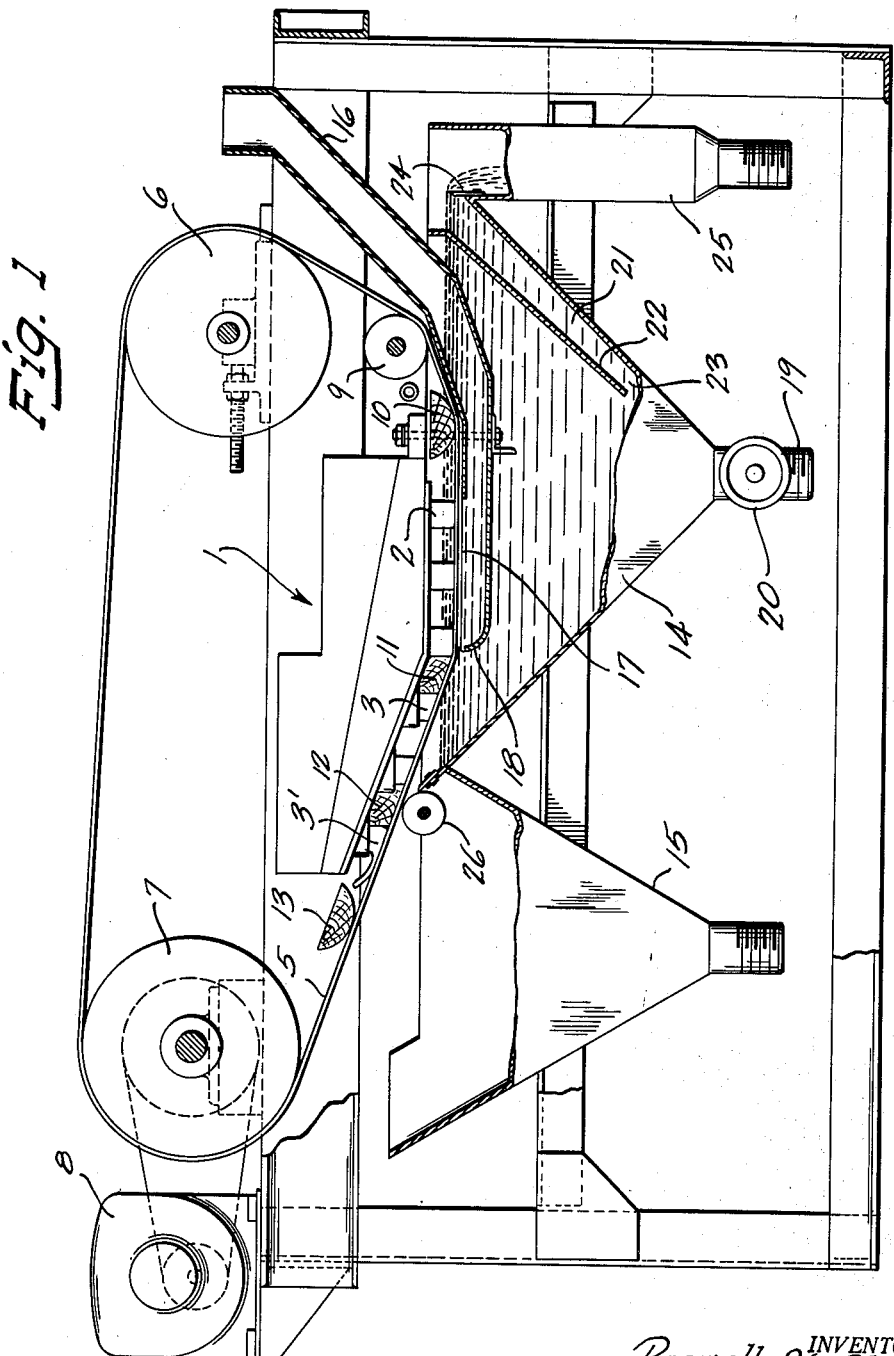
INVENTORS
Roswell H. Stearns
Harold W. Buus
BY
Arthur R. Woofter
Attorney Feb. 10, 1953 R. H. STEARNS ET AL 2,627,976
MAGNETIC SEPARATOR
Filed July 24, 1950 3 Sheets-Sheet 2
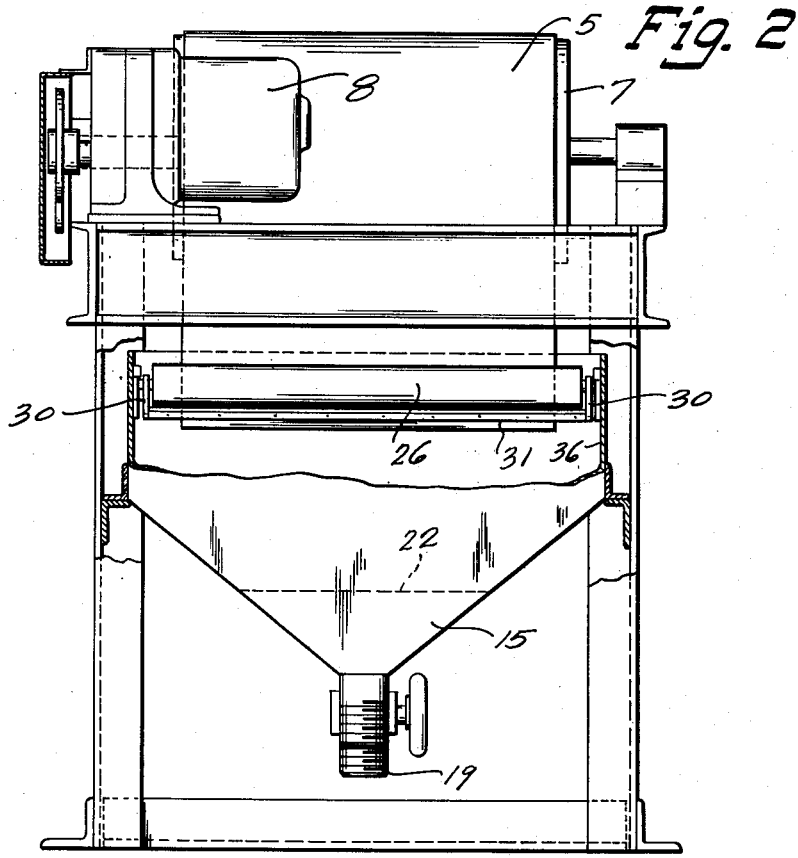
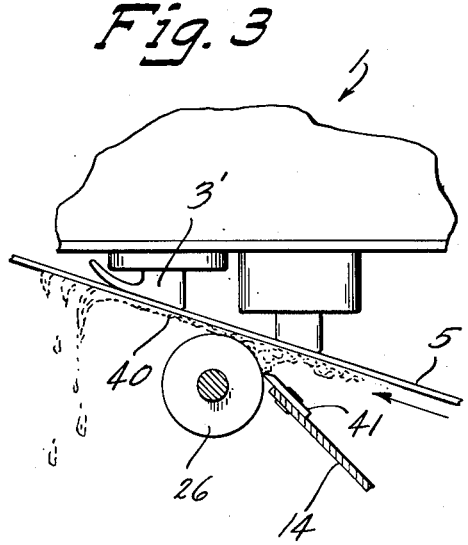
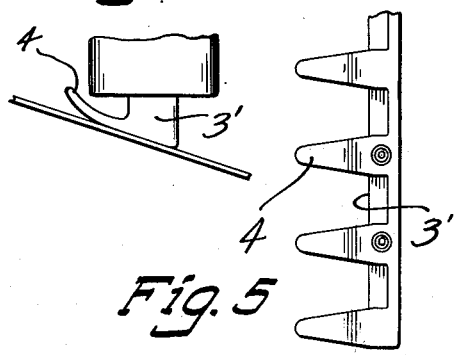
INVENTORS.
Roswell H. Stearns
Harold W. Buus
BY
Arthur R. Woofford
Attorney Feb. 10, 1953 R. H. STEARNS ET AL 2,627,976
MAGNETIC SEPARATOR
Filed July 24, 1950 3 Sheets-Sheet 3
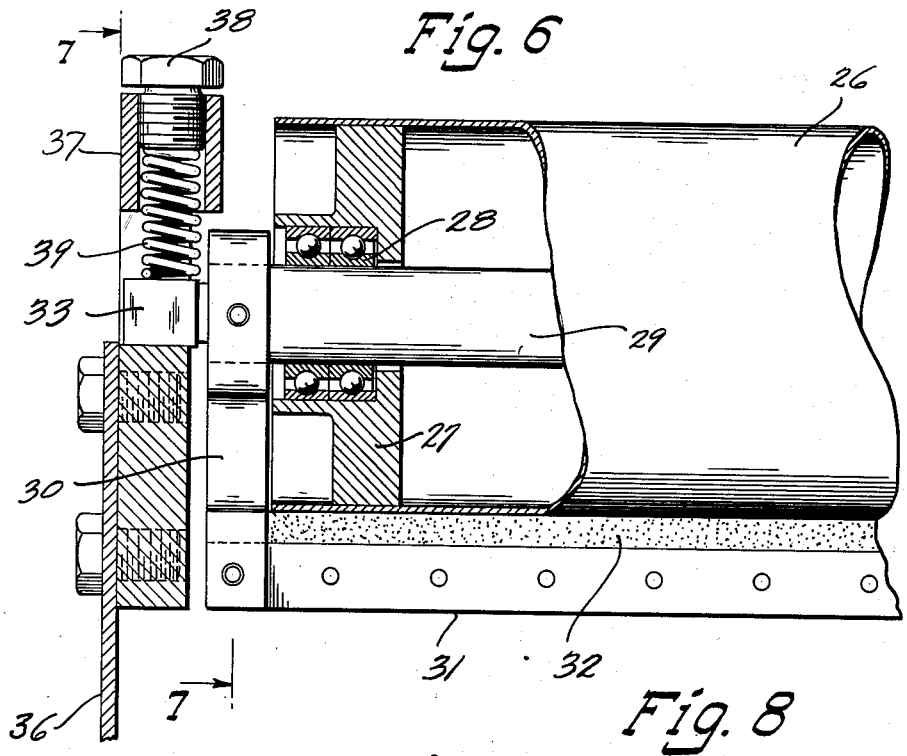
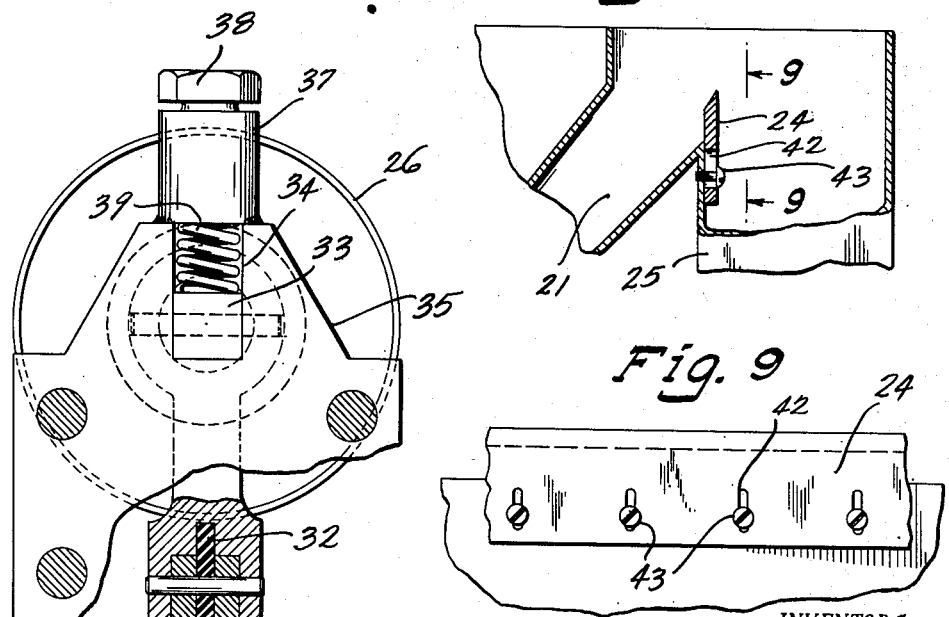
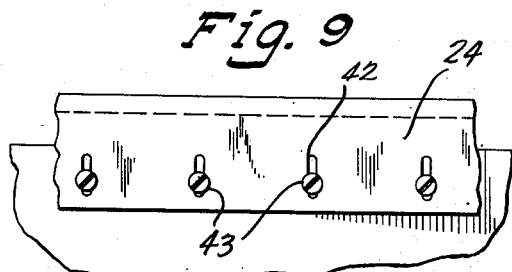
INVENTORS.
Roswell H. Stearns
Harold W. Buus.
BY
Arthur R. Woolfolk
Attorney Patented Feb. 10, 1953

2,627,976

UNITED STATES PATENT OFFICE 2,627,976

MAGNETIC SEPARATOR

Roswell H. Stearns, Wauwatosa, and Harold W. Buus, Milwaukee, Wis., assignors, by direct and mesne assignments, of one-half to said Roswell H. Stearns and one-half to Roswell N. Stearns, Fox Point, Wis.

Application July 24, 1950, Serial No. 175,576

6 Claims. (Cl. 209—223)

This invention relates to magnetic separators.

The primary purpose of this invention is to provide a magnetic separator which is especially designed for the recovery of ferro silicon, or magnetite, or other materials of this general nature, which are used in the cleaning and purifying of coal and the recovery of ores and other materials which are subjected to treatment by the heavy-media separation process.

In heavy-media separation a solution of a given specific gravity, consisting of a prepared mixture of magnetic solids and water, is delivered by suitable means to a separatory vessel. The specific gravity of solution is obtained by the suspension of known quantities of finely ground ferro silicon, or magnetite, or similar materials in the separatory vessel. The two or more minerals or materials, which are thus properly prepared and which it is desired to separate, are introduced while submerged into the separatory chamber. In this process it is imperative that the exact specific gravity of the solution be maintained at all times, and that substantially no variation be permitted from the desired specific gravity. It is obvious that as the separated materials are removed from the solution some of the ferro silicon or magnetite is carried away with these materials, and thus a portion of these materials which produce the desired specific gravity are constantly removed from the separatory vessel.

This invention is designed to provide a magnetic separator which is so made that it will recover the ferro silicon, magnetite, or other material of this nature to a remarkably high degree so that only a minute fraction of one per cent is ultimately lost, and so that the recovered magnetic materials can be returned to the separatory vessel, and thus the predetermined or selected specific gravity in the separatory chamber can be maintained at a substantially constant value.

When it is considered that the heavy-media separation process is frequently employed in the separation of materials of higher specific gravity from materials of lower specific gravity, as in low grade ores, for example, and when it is considered further that the magnetic material for producing the desired specific gravity, such as ferro silicon and magnetite, are very expensive and are used in great quantities, it will be apparent that the recovery of this material by the magnetic separator has to be approximately perfect in order to efficiently and economically conduct the separating process. Further objects are, therefore, to provide for the recovery of non-magnetic material and a substantial portion of the liquid for reuse. This is accomplished by providing a channel in the separatory chamber of the magnetic separator for the overflow of said liquid, said channel being located at the inlet side or the right or far end of said separatory chamber with intake for the overflow substantially below the level of the liquid and adjacent the non-magnetic material outlet in said chamber, the outlet in said channel emptying into a receiving tank for return to the circuit where the liquid is again used in the mixture.

When it is considered that the success of the heavy-media process lies in the maximum recovery of values, both magnetic and non-magnetic, it will readily be seen that the all-important function of the magnetic separator is to effect savings in all branches of its operation.

Attention is, therefore, directed to a further object of the invention, which includes the recovery of a substantially greater portion of the non-magnetic material than would otherwise be possible. This is accomplished by providing for the channeling of the liquid overflow as herein described, which directly prevents, to a major degree, the turbulence near the surface of the liquid in the separatory chamber caused by the feed and the action of the magnetic particles in releasing the non-magnetic particles. The fines of the non-magnetic portion, therefore, cannot float off, but are allowed to settle and be discharged with the coarse non-magnetic portion, and thus where values are found in said non-magnetic portion, greater economies in operations are obtained.

Further advantages of this invention are obtained in the operation of the separator. For example, the utilization of this channel for overflow of excess liquid enables maintaining a constant water level in the separatory chamber under a greater variation of feed volumes to the magnetic separator, because of the ability to discharge the major portion of liquid through the channel without creating detrimental turbulence and water currents in the separating zone. Other types of separators, particularly those which have an overflow adjacent the upper surface of the liquid, and which are used for similar purposes cannot efficiently maintain a constant water level under widely varying feed conditions, thus resulting in loss of operating water level, loss of separation of magnetic from non-magnetic material, which in turn causes loss of time and of expensive materials to restore required operation.

Further objects are to provide a magnetic separator in which a traveling belt is passed through a liquid, in which the materials to be separated are presented by suitable feed means to the under side of the belt, and are passed beneath successive magnetic poles of alternating polarity but of uniform strength, said belt being drawn along and beneath a flat or separating portion and an upwardly slanting or delivery portion of the magnetic structure, the last or final pole having extended fingers pointing toward the discharge end of the separator to thereby facilitate discharge of the magnetic material.

An additional object of this invention is to provide means whereby the magnetic material approaching the discharge portion or zone of the traveling belt is subjected to a powerful wringing or dewatering action, said dewatering means comprising a roller magnetically actuated, operating in conjunction with said belt conveyor to produce equal pressure on the magnetic material though the load on said belt varies to thereby cause the water to be squeezed from the material in a uniform and effective manner under all conditions of load.

An embodiment of the invention is shown in the accompanying drawings, in which:

Figure 1 is a side elevation with parts broken away and parts in section showing the separator.

Figure 2 is a view from the rear end of Figure 1 with parts broken away and with parts in section.

Figure 3 is a detail view partly in section and partly broken away showing the discharge portion of the separator and the dewatering or wringing roller.

Figure 4 is an enlarged detail of the last pole structure looking from the side.

Figure 5 is a view of the pole shown in Figure 4 looking from the bottom thereof.

Figure 6 is an enlarged view of the dewatering or wringing roller, such view partly in section and broken away.

Figure 7 is a fragmentary sectional view approximately on the line 7—7 of Figure 6.

Figure 8 is an enlarged sectional detail of a portion of the front end of the separator showing the liquid overflow.

Figure 9 is a fragmentary view taken on the line 9—9 of Figure 8.

Referring to the drawings, it will be seen that the separator comprises a magnet structure indicated generally by the reference character 1 which is provided with a series of downwardly projecting poles 2 with their bottom edges arranged in a horizontal or flat line. This portion of the magnet structure will hereinafter be referred to as the flat portion thereof. The magnet structure also has a series of downwardly projecting poles 3 which are arranged in a slanting manner, the end of the series of poles being indicated by the reference character 3′ and being shown in greater detail in Figures 3, 4, and 5. This end pole 3′ is provided with a plurality of tapered, rearwardly projecting fingers 4 which are also upturned, as shown clearly in Figure 4.

The separator is provided with a belt conveyor 5 which is carried by an idler pulley 6 at the intake end and by a driving pulley 7 at the discharge end. The driving pulley 7 is driven through reduction gearing and a chain drive from an electric motor 8. The belt is also guided by a guide pulley or small pulley 9 adjacent its bottom stretch. This arrangement insures a taut lower stretch of the belt. The belt runs over a wooden guide 10 which has rounded ends and a series of wooden guides 11 and 12 and a final guide 13.

The separator is provided with a separatory chamber 14 and a discharge chamber 15, which latter receives the magnetic material. The mixed material, consisting of magnetic and non-magnetic material in the form of a slurry, is fed downwardly through the chute or feed pipe 16. This feed pipe extends downwardly below the liquid level in the separatory chamber 14 and is closed on all sides except at its extreme lower portion. This lower portion has an open section 17 immediately below the belt and an upturned portion 18 at its extreme end. The mixture of magnetic and non-magnetic material is thus fed to the under side of the belt below the separating poles 2. These separating poles 2 are of uniform magnetic intensity and of alternate polarity. The material is washed thoroughly and the non-magnetic material is shaken loose and washed free of the magnetic material while the belt passes below the poles 2 and while the material is below the liquid level in the separatory chamber 14. The non-magnetic material freely falls downwardly into the separatory chamber 14 and is discharged through its discharge portion 19, a suitable valve 20 being provided to assist in maintaining the liquid level in the separatory chamber. However, the liquid level is maintained in the separatory chamber 14 primarily by the novel arrangement of liquid discharge means hereinbelow described. This liquid discharge means consists of a channel 21 which is formed between the forward side of the downwardly tapered separatory chamber and a baffle 22. It opens at a point 23 far below the upper liquid level and the liquid passes upwardly through the channel 21 and is discharged over an adjustable plate or dam 24 into the liquid discharge chamber or pipe 25.

Particular attention is called to the fact that this discharge of the liquid is so arranged that it prevents turbulence at the surface or liquid level and thus prevents needless turbulence at the point where separation occurs. A further and very important feature of this mode of discharging the liquid is that the "fines" which often temporarily float on the surface of the liquid are not swept into the liquid discharge pipe 25. Instead they settle downwardly along with the rest of the non-magnetic material to the bottom of the separatory chamber 14 and are discharged through its discharge outlet 19.

The slanting portion of the magnetic structure coacts with the traveling belt conveyor and constitutes the conveying or discharge portion as distinguished from the separating portion. The clinging magnetic material is carried upwardly past the poles 3 to the final pole 3′ and passes over a wringing or dewatering roller 26. This dewatering roller is formed of magnetic material and is drawn upwardly by the flux from the adjacent poles of the slanting portion of the magnet structure. The details of the roller construction or roller assembly are shown in Figures 6 and 7. The roller 26 consists of a magnetic cylindrical portion carried by end flanges 27 which are supported from bearings 28 carried by a non-rotating shaft 29. This shaft also carries end members or crossheads 30 which are joined by means of a transverse rigid strip 31 carrying a rubber wiping strip 32 which rubs against the under side of the roller 26. The ends of the shaft 29 are squared as indicated at 33 and ride in slots 34 formed in end guide members 35 carried by the side flanges or stationary portion 36 of the separator. The end guides 35 are provided with an overhanging cylindrical portion 37 within which a screw 38 is threaded. Helical compression springs 39 are located at opposite ends of the wringing roller. One of the springs is shown in both Figures 6 and 7. The spring 39 has its upper end bearing against the under side of the adjusting screw 38 and its lower end bearing against the squared section 33 of the shaft 29. Thus the wringing roller or magnetic dewatering roller is urged downwardly by the spring 39 at opposite ends of its non-rotating shaft 29. However, it is pulled upwardly against the action of the springs into contact with the magnetic material clinging to the under side of the conveyor belt 5. The magnetic material is indicated by the reference character 40 in Figure 3 and it will be seen that the roller 26 bears tightly against such magnetic material and serves to wring out or squeeze out excess liquid. Also it is to be noted particularly that the pressure of the roller against the magnetic material is substantially independent of the thickness of the layer of magnetic material clinging to the under side of the belt.

It is apparent that as the magnetic roller 26 is drawn upwardly that the force of the springs 39 increases and that the pressure exerted on the clinging magnetic material is the difference between the upward magnetic pull and the downward force of the springs. Also, in view of the fact that the magnetic flux is conducted directly to the magnetic roller through the clinging magnetic material, it is apparent that the flux will cause a heavy pressure to be exerted by the roller for either a thin or a thick layer of clinging magnetic material. It is clear, therefore, that substantially constant pressure will be exerted by the magnetic dewatering roller independently of the thickness of the clinging magnetic material and that an efficient and profound dewatering action will be produced under all conditions.

It is to be noted that a rubber wiper strip 41 is carried by the upwardly extending portion of the tank 14 and bears against the roller 26 and thus serves to assist in conducting the liquid squeezed out of the magnetic material 40 back into the separatory chamber or tank 14. The magnetic material, after it has been dewatered, finally passes beyond the pole 3' and through the lessening magnetic field thereof into a position of zero field and is discharged from the belt.

It is to be noted further that the overflow for the liquid from the separatory chamber 14 does not disturb the upper surface of the liquid in such separatory chamber as has been previously described. Also the liquid level within the separatory chamber is maintained substantially constant independent of the quantity of slurry fed into the separatory chamber as the liquid can freely flow outwardly through the channel 21 without substantially altering the liquid level in the chamber 14.

Further than this, the liquid level in the chamber 14 can be adjusted by adjusting the strip or plate 24, as shown most clearly in Figures 8 and 9. The plate 24 is provided with a plurality of slots 42 through which the screws 43 pass, thus permitting the plate 24 to be raised or lowered as desired.

It is to be noted further that as the wringing or dewatering roller 26 rises or falls, that the roller assembly as a unit rises and falls and consequently the rubber wiper strip 32, see Figures 6 and 7, is maintained in wiping engagement with the lower surface of the wringing roller or dewatering roller. Obviously the pressure of the springs 39 urging the roller 26 downwardly can be adjusted by adjusting the screws 38.

It will be seen that a novel magnetic separator has been provided by this invention in which the separating poles of the magnet structure are arranged in the same flat or horizontal plane and do not thrust the material downwardly to varying depths in the liquid in the separatory chamber. Instead the poles, as stated, extend only to exactly the same depth at the separating portion of the magnet structure. Further, turbulence of the liquid at this point is substantially avoided by the novel manner in which the liquid is withdrawn from the separatory chamber 14.

It will be seen further that the dewatering or wringing roller exerts a substantially uniform pressure on the magnetic material clinging to the under side of the belt and produces a powerful and uniform dewatering action independently of the thickness of such material.

Although this invention has been described in considerable detail, it is to be understood that such description is intended as illustrative rather than limiting, as the invention may be variously embodied and is to be interpreted as claimed.

We claim:

1. A magnetic separator for separating magnetic and non-magnetic material in a submerged state, comprising feeding means for said material, a liquid containing separatory chamber, a discharge tank, a magnet structure having a flat section and an angular section, a belt conveyor arranged to travel below said flat and angular sections, said sections of said magnetic structure having a series of magnetic fields constituting, respectively, separating and conveying zones for said material, said flat section having poles of alternate polarity and said flat section having its poles submerged in the liquid in said separatory chamber and being adapted to wash the material clinging to the under side of said conveyor belt and to discharge the non-magnetic portion of such material, the magnetic fields of said angular section causing the conveying of the magnetic portion by said belt conveyor to the far end of said magnet structure where said material is dewatered by passing between a magnetized ferromagnetic roller and said conveyor belt, said roller being inductively magnetized by flux lines from the end poles passing through the ferro-magnetic roller, said roller being actuated by the magnet structure to move in an upward direction, and counteracting springs controlling the pressure or squeeze on said material, said springs being adjustable to control the amount of water being removed from the magnetic material, and said material thereafter passing to a position of zero flux intensity thereby allowing said magnetic portion to be freely and automatically discharged into said discharge tank.

2. A magnetic separator for separating a mixed slurry of magnetic and non-magnetic material in a submerged state comprising a liquid containing separatory chamber, a discharge chamber, a magnet structure having a flat section and an angular section, a belt conveyor coacting with said magnet structure for separating and conveying the separated magnetic portion to the discharge chamber, said separatory vessel having an opening therein for the passage of non-magnetic material therefrom, a dewatering ferromagnetic roller movably mounted and inductively magnetized by said magnet structure and being drawn upwardly thereby towards said belt conveyor, and means comprising adjustably mounted compression springs for maintaining constant pressure on said magnetic material between said belt conveyor and said roller as the load of magnetic material varies.

3. A magnetic separator for separating a mixed slurry of magnetic and non-magnetic material in a submerged state comprising a liquid containing separatory chamber, a discharge chamber, a belt conveyor arranged to travel across said chambers, a magnet structure cooperating with said belt conveyor and having a flat and an angular section and having a plurality of poles in each section, the poles of said flat section being submerged in the liquid in said separatory chamber and being of alternate polarity to agitate said material and effect the release of the non-magnetic material while in the separatory chamber, the angular section of said magnet structure having magnetic fields arranged to sustain magnetic material in contact with said belt conveyor as it moves towards said discharge tank, a movably mounted inductively magnetized dewatering roller arranged to be drawn upwardly by magnetic attraction towards said belt conveyor and to vary its distance therefrom corresponding with the load of magnetic material carried by said belt and to provide a predetermined uniform dewatering under varying load conditions.

4. A magnetic separator for separating a mixed slurry of magnetic and non-magnetic material in a submerged state, said magnetic separator comprising a magnet structure having a submerged separating zone and a zone for carrying away the magnetic material, a belt conveyor arranged to travel beneath said magnet structure, feeding means for feeding said slurry to said belt in said separating zone, an inductively magnetized dewatering roller for removing a predetermined amount of the surplus liquid from the magnetic material while the magnetic material is being conveyed to the discharge end of the magnet structure, said dewatering roller being mounted near the discharge end and subject to the influence of said magnet structure to produce an upward squeeze movement, and means for causing the automatic discharge of magnetic material from said belt conveyor after said belt conveyor has passed said magnet structure.

5. A magnetic separator for use in a closed circuit in which a uniform balance of all the elements circulated therein must be maintained for economic and continuous operation, said magnetic separator being arranged for separating a mixed slurry of magnetic and non-magnetic material and comprising a magnet structure, a separatory chamber and a discharge chamber, a belt conveyor arranged to travel beneath said magnet structure and across said chambers, means for feeding said slurry to the under side of said belt in said separatory chamber, said separatory chamber having a discharge channel for the liquid opening at a point below the liquid level and adjacent the lower portion of said separatory chamber to thereby cause decanting of the liquid without causing either turbulence or a transverse flow at the level of said liquid.

6. A magnetic separator for use in a closed circuit and arranged to separate a mixed slurry of magnetic and non-magnetic material, dewatering means for dewatering the magnetic material, means for recovering the coarse non-magnetic material and a substantial portion of the non-magnetic fines and for clarifying the discharged liquid to permit its return for reuse in said circuit, said last recited means including a separatory chamber having a control outlet for the non-magnetic material, said separatory chamber having a submerged overflow channel to prevent the loss of fines due to turbulence in the upper portion of the separatory chamber, said overflow channel having its intake opening at a point a substantial distance below the liquid level in said separatory chamber to prevent a transverse flow at the surface of the liquid to thereby prevent sweeping of the fines from said separatory chamber and having an outlet opening with adjustable means for controlling the level of liquid in said separatory chamber to thereby decant the liquid while the non-magnetic fines in said separatory chamber settle and pass into the outlet for the non-magnetic material.

ROSWELL H. STEARNS.
HAROLD W. BUUS.

REFERENCES CITED

The following references are of record in the file of this patent:

UNITED STATES PATENTS

| Number | Name | Date |
|---|---|---|
| 954,016 | Bent | Apr. 5, 1910 |
| 2,410,601 | Crockett | Nov. 5, 1946 |
| 2,422,113 | Martin | June 10, 1947 |
| 2,471,911 | Stearns | May 31, 1949 |